United States Patent
Liu et al.

(10) Patent No.: US 11,991,251 B2
(45) Date of Patent: May 21, 2024

(54) ACCESS FOR RESOURCES DURING REMOTE SESSION

(71) Applicant: CITRIX SYSTEMS, INC., Fort Lauderdale, FL (US)

(72) Inventors: Xuan Liu, Nanjing (CN); Wenshuang Zhang, Nanjing (CN)

( * ) Notice: Subject to any disclaimer, the term of this patent is extended or adjusted under 35 U.S.C. 154(b) by 0 days.

(21) Appl. No.: 17/498,192

(22) Filed: Oct. 11, 2021

(65) Prior Publication Data
US 2023/0083996 A1 Mar. 16, 2023

Related U.S. Application Data

(63) Continuation of application No. PCT/CN2021/118469, filed on Sep. 15, 2021.

(51) Int. Cl.
*H04L 67/146* (2022.01)
*G06V 30/148* (2022.01)
*G06V 30/416* (2022.01)
*H04L 65/403* (2022.01)

(52) U.S. Cl.
CPC .......... *H04L 67/146* (2013.01); *G06V 30/416* (2022.01); *H04L 65/403* (2013.01); *G06V 30/148* (2022.01)

(58) Field of Classification Search
CPC ..... H04L 67/146; H04L 65/403; G06V 30/10; G06V 30/416
USPC ........................................................ 709/204
See application file for complete search history.

(56) References Cited

U.S. PATENT DOCUMENTS

| | | | | |
|---|---|---|---|---|
| 5,475,768 A | * | 12/1995 | Diep | G06V 10/20 382/156 |
| 9,547,631 B1 | * | 1/2017 | Chitta | G06F 3/1454 |
| 2004/0119741 A1 | * | 6/2004 | Teng | G06F 16/9577 707/E17.121 |
| 2006/0161864 A1 | * | 7/2006 | Windl | G06F 3/0482 715/810 |
| 2013/0335316 A1 | * | 12/2013 | Smith | H04L 67/1061 345/156 |
| 2014/0330963 A1 | * | 11/2014 | Lee | H04N 21/4782 709/224 |
| 2015/0254520 A1 | * | 9/2015 | Park | G06Q 30/0267 382/184 |
| 2022/0311813 A1 | * | 9/2022 | Ramirez Flores | H04L 65/4015 |

FOREIGN PATENT DOCUMENTS

EP   1979858 A1 * 10/2008   ............. G06K 9/033

* cited by examiner

*Primary Examiner* — Zi Ye

(57) ABSTRACT

A method may include detecting, within a remote session, a gesture indicative of an intent of a participant in the remote session to share a resource included within content being shared by a first client device participating in the remote session. The resource may be available on a network. In response to detection of the gesture, information for accessing the resource may be extracted from an image of the content. At least a portion of the information may be provided to a second client device participating in the remote session to enable the second device to access the resource. Related systems and articles of manufacture are also provided.

18 Claims, 8 Drawing Sheets

ACCESS FOR RESOURCES DURING REMOTE SESSION

CROSS REFERENCE TO RELATED APPLICATIONS

This application is a continuation application of International Application No. PCT/CN2021/118469, filed Sep. 15, 2021 and entitled "ACCESS FOR RESOURCES DURING REMOTE SESSION," the disclosure of which is incorporated herein by reference in its entirety.

TECHNICAL FIELD

The subject matter described herein relates generally to web conferencing and more specifically to providing remote access to resources during a remote session.

BACKGROUND

A hyperlink may provide access to a web resource by at least specifying a location of the web resource on a computer network and a mechanism for retrieving the web resource. The hyperlink may provide access to a variety of resources including, for example, webpages, computer programs, multimedia files, electronic documents, and/or the like. Moreover, the resource may be referenced by a hyperlink. In order for a client to access a web resource, a browser at the client may retrieve, based on the corresponding link, the web resource from a remote server hosting the web resource.

SUMMARY

Methods, systems, and articles of manufacture, including computer program products, are provided for providing access to one or more resources during a remote session. In one aspect, there is provided a system including at least one data processor and at least one memory. The at least one memory may store instructions, which when executed by the at least one data processor, cause the at least one data processor to at least: detect, within a remote session, a gesture indicative of an intent of a participant in the remote session to share a resource included within content being shared by a first client device participating in the remote session, and the resource being available on a network; in response to detection of the gesture, extract, from an image of the content, information for accessing the resource; and provide, to a second client device participating in the remote session, at least a portion of the information to enable the second device to access the resource.

In some variations, one or more of the features disclosed herein including the following features can optionally be included in any feasible combination. The at least one data processor may be further caused to at least: perform, on the image of the content, a first image recognition to determine that the content includes the information for accessing the resource; in response to determining that the content includes the information for accessing the resource, perform, on the image of the content, a second image recognition to determine a position of an address bar; and perform, based at least on the position of the address bar, a text recognition to identify one or more alphanumeric characters or symbols representative of the information for accessing the resource.

In some variations, the first image recognition or the second image recognition may be performed by applying one or more neural networks trained to perform image classification, object detection, object tracking, semantic segmentation, or instance segmentation.

In some variations, the text recognition may be performed by applying one or more optical character recognition (OCR) techniques.

In some variations, the at least one data processor may be further caused to at least: in response to a failure to extract the information from the image of the content, generate, for display at the first client device, a message that indicates error.

In some variations, the information sent to the second client device may trigger a launch of an application to access the resource. The application may include a browser, a media player, and/or a text editor.

In some variations, the resource may include a webpage, a computer program, a multimedia file, and/or an electronic document.

In some variations, the information for accessing the resource may include a universal resource locator (URL), a hyperlink, a web address, or a network path.

In some variations, the gesture may include a threshold quantity of mouse clicks or taps on a touchscreen.

In some variations, the remote session may include a web conference session including the first client device and the second client device.

In some variations, the content shared by the first client device may be displayed at the first client device and the second client device.

In another aspect, there is provided a method for providing access to one or more resources during a remote session. The method may include: detecting, within a remote session, a gesture indicative of an intent of a participant in the remote session to share a resource included within content being shared by a first client device participating in the remote session, and the resource being available on a network; in response to detection of the gesture, extracting, from an image of the content, information for accessing the resource; and providing, to a second client device participating in the remote session, at least a portion of the information to enable the second device to access the resource.

In some variations, one or more of the features disclosed herein including the following features can optionally be included in any feasible combination. The method may further include: performing, on the image of the content, a first image recognition to determine that the content includes the information for accessing the resource; in response to determining that the content includes the information for accessing the resource, performing, on the image of the content, a second image recognition to determine a position of an address bar; and performing, based at least on the position of the address bar, a text recognition to identify one or more alphanumeric characters or symbols representative of the information for accessing the resource.

In some variations, the first image recognition or the second image recognition may be performed by applying one or more neural networks trained to perform image classification, object detection, object tracking, semantic segmentation, or instance segmentation.

In some variations, the method may further include: in response to a failure to extract the information from the image of the content, generating, for display at the first client device, a message that indicates error.

In some variations, the information sent to the second client device may trigger a launch of an application to access the resource. The application may include a browser, a media player, and/or a text editor.

In some variations, the resource may include a webpage, a computer program, a multimedia file, and/or an electronic document. The information for accessing the resource may include a universal resource locator (URL), a hyperlink, a web address, or a network path.

In some variations, the gesture may include a threshold quantity of mouse clicks or taps on a touchscreen.

In another aspect, there is provided a computer program product that includes a non-transitory computer readable storage medium. The non-transitory computer-readable storage medium may include program code that causes operations when executed by at least one data processor. The operations may include: detecting, within a remote session, a gesture indicative of an intent of a participant in the remote session to share a resource included within content being shared by a first client device participating in the remote session, and the resource being available on a network; in response to detection of the gesture, extracting, from an image of the content, information for accessing the resource; and providing, to a second client device participating in the remote session, at least a portion of the information to enable the second device to access the resource.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to providing access to resources shared during a web conferencing session, it should be readily understood that such features are not intended to be limiting. The claims that follow this disclosure are intended to define the scope of the protected subject matter.

DESCRIPTION OF DRAWINGS

When practical, like reference symbols in the various drawings indicate like elements.

DETAILED DESCRIPTION

Figure 1:
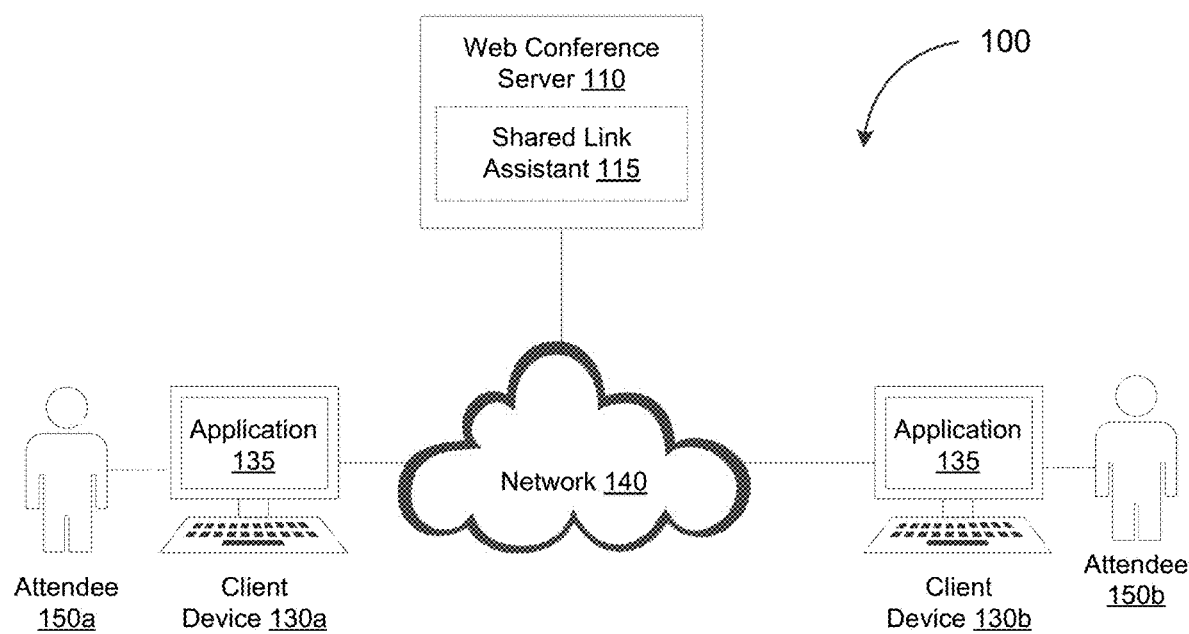
FIG. 1 depicts a system diagram illustrating an example of a web conferencing system, in accordance with some example embodiments.

An application (e.g., a web conferencing application) may provide access to a virtual meeting room in which multiple users in different locations may engage in real time audio data and/or video communication. The application may support web conferences or web conferencing which, as used herein, may refer to a variety of online conferencing and collaborative services including, for example, web seminars (webinars), webcasts, web meetings, and/or the like. As such, the application may support a variety of virtual or electronic collaboration sessions (e.g., online communication sessions) between two or more web-connected devices including, for example, meetings, training events, lectures, presentations, and/or the like. Moreover, the application may also provide various collaborative features such as real time content sharing and editing. For example, a remote session, such as a web conference session, may include multiple attendees including a host who is responsible for scheduling the remote session and one or more presenters who are responsible for contributing content during the remote session. The application may thus provide a screen share functionality, which allows a presenter to share at least a portion of the content displayed at a device of the presenter and have that content displayed at the devices of the other attendees.

The portion of the content that is being shared during the remote session may include content that is accessible through a hyperlink, a web address, a network path, and/or the like. For example, the portion of the content shared during the remote session may include a resource, such as a web page, a computer program, a multimedia file, an electronic document, and/or the like, that is accessible at a location specified by one or more links or addresses. Typically, the resource may be accessed by selecting the information for accessing the resource, for example, via a mouse click or a tap on a touchscreen. Examples of information for accessing the resource include hyperlinks, web addresses, and network paths. However, although the information for accessing the resources included in the shared content are displayed at the devices of the other attendees, an attendee viewing the shared content may be unable to click on the information to access the corresponding resources at least because the shared content is merely presented as an image (or series of images) at the device of the attendee. Instead, to provide access to the linked resources, a conventional web conference application may require the attendee sharing the content to send the corresponding information to the other attendees manually, such as by copying and pasting the links in a chat window. Such additional steps or actions to communicate information about a resource to attendees can be distracting to the presenter when giving a presentation, and thus negatively impact the user experience of the application. Additionally, often times copying and pasting information can be done incorrectly, which can prevent attendees from accessing the resources linked. Such errors are frustrating to both the presenter and attendee alike. Alternatively, the presenter during the session may access the link to present information from a resource within the session but this not desirable in most instances because the content of the session must be displaced to make room to show the information of the resource. This may also lead to application switching (e.g., going between PowerPoint and web browser applications) which can be distracting to attendees and presenters. Moreover, presenters may find themselves lost in a myriad of open windows when multiple resources are accessed, which makes returning to the content of the session difficult and time consuming.

In some example embodiments, a web conference application may support interactions with information for accessing resources during a remote session. For example, a first attendee of a remote session may share, with a second attendee of the remote session, at least a portion of the content displayed at a first client device of the first attendee. The shared content may include resources and the information for accessing the resources such as one or more links such as hyperlinks, network paths, and/or the like. By sharing this content with the second attendee, the content may also be displayed at a second client device of the second attendee. A shared link assistant at a web conference server communicatively coupled with the first client device and the second client device may be configured to detect when the content includes information for accessing the resources included in the content. For instance, the shared link assistant may perform image recognition and/or text recognition to extract the one or more links present in an image, such as a screenshot, of the shared content. Furthermore, the shared link assistant may send, to the second client device, the information for accessing the resources such that the resources may be accessed by an application at the second client device such as a browser, a media player, a text editor, and/or the like.

FIG. 1 depicts a system diagram illustrating an example of a web conferencing system 100, in accordance with some example embodiments. Referring to FIG. 1, the web conferencing system 100 may include a web conference server 110 including a shared link assistant 115 that is communicatively coupled via a network 140 with one or more client devices 130 including, for example, a first client device 130a, a second client device 130b, and/or the like. In the example shown in FIG. 1, the shared link assistant 115 is deployed at the web conference server 110 but it should be appreciated that the shared link assistant 115 may also be deployed, at least partially, at the one or more client devices 130. The one or more client devices 130 may be processor-based devices including, for example, a smartphone, a personal computer, a tablet computer, a wearable apparatus, an Internet-of-Things (IoT) appliance, and/or the like. The network 140 may be a wired network and/or a wireless network including, for example, a local area network (LAN), a virtual local area network (VLAN), a wide area network (WAN), a public land mobile network (PLMN), the Internet, and/or the like.

A web conferencing application 135 at the one or more client devices 130 may be configured to provide access to a virtual meeting room in which multiple attendees, such as a first attendee 150a at the first client device 130a and a second attendee 150b at the second client device 130b, may engage in real time audio data and/or video communication. In some cases, the web conferencing application 135 may be a cloud-based software application that is hosted at a central server, such as the web conference server 110, on one or more virtual machines. Alternatively and/or additionally, the web conferencing application 135 may be provided as part of a workspace in a virtual desktop, such as a high definition virtual desktop, in which case the functionalities of the web conferencing application 135 may be accessible during a virtual desktop session.

The web conferencing application 135 may support a screen sharing functionality in which, for example, at least a portion of the content displayed at the first client device 130a is shared with and displayed at the second client device 130b. The content that the first client device 130a shares with the second client device 130b may include one or more resources as well as information for accessing such resources. For instance, the content may include a variety of resources such as webpages, computer programs, multimedia files, electronic documents, and/or the like, and the links for accessing such resources. In some example embodiments, the shared link assistant 115, which may be implemented as a software or hardware module (or engine) at the web conference server 110, may be configured to detect when the content includes one or more links for sharing with the second attendee 150b at the second client device 130b. For example, the shared link assistant 115 may perform image recognition and/or text recognition to extract, from an image of the shared content, the information for accessing the resources included in the content. Furthermore, the shared link assistant 115 may send, to the second client device 130b, the information for accessing the resources such that the resources may be accessed by an application at the second client device 130b such as a browser, a media player, a text editor, and/or the like.

Figure 2:
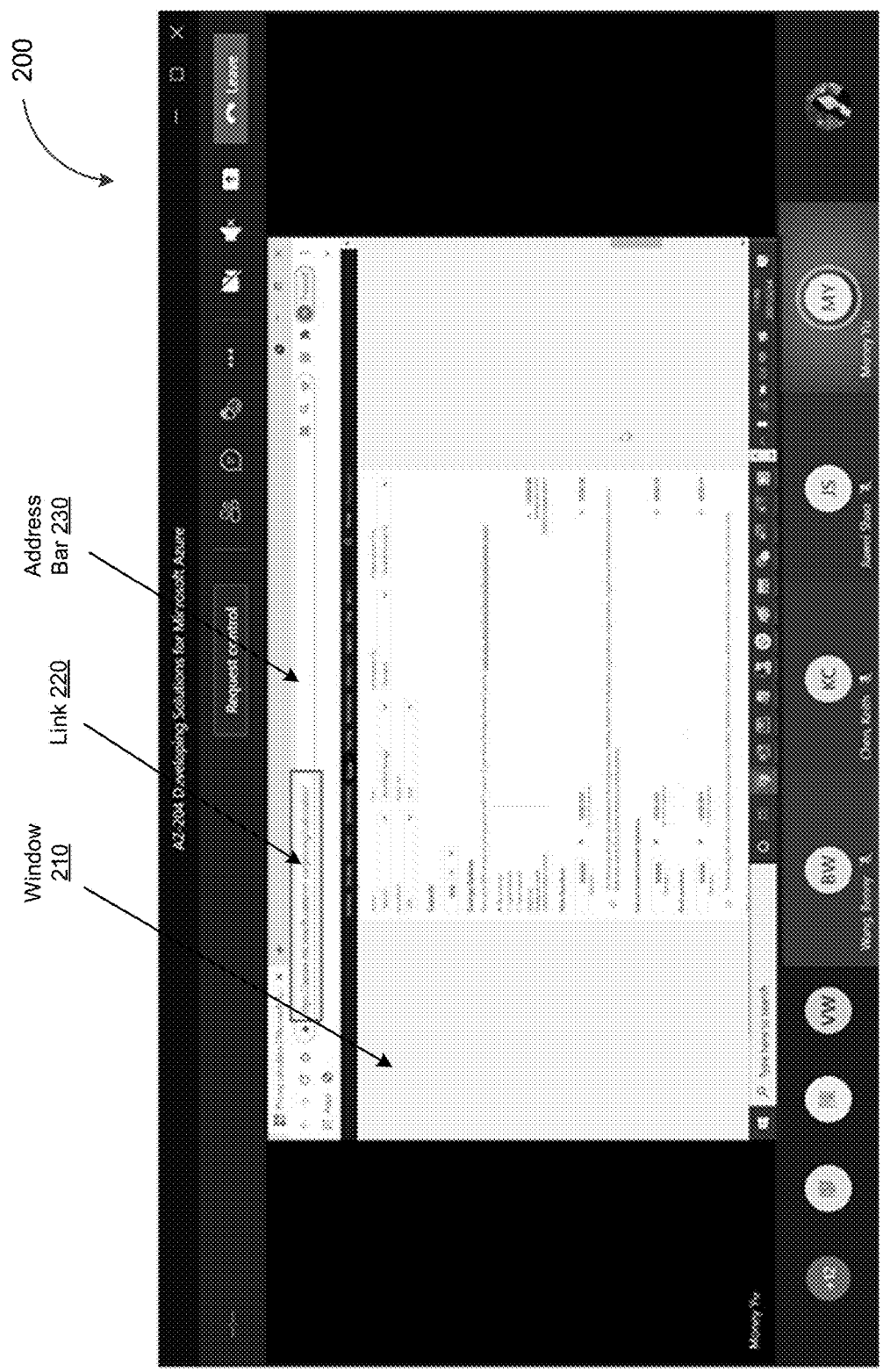
FIG. 2 depicts an example of a shared content, in accordance with some example embodiments.

To further illustrate, FIG. 2 depicts an example of a shared content 200, which the first attendee 150a at the first client device 130a may share with at least the second attendee 150b at the second client device 130b. In the example shown in FIG. 2, the shared content 200 may include a web browser window 210 in which a link 220, such as the universal resource locator (URL) of the webpage displayed within the web browser window 210, is displayed within an address bar 230. In some example embodiments, the shared link assistant 115 may monitor for one or more gestures indicative of an intent to share the link 220 with the second attendee 150b at the second client device 130b. Examples of such gestures include a threshold quantity of mouse clicks and/or taps on a touchscreen at the first client device 130a such as double mouse clicks or double taps.

Figure 3A:
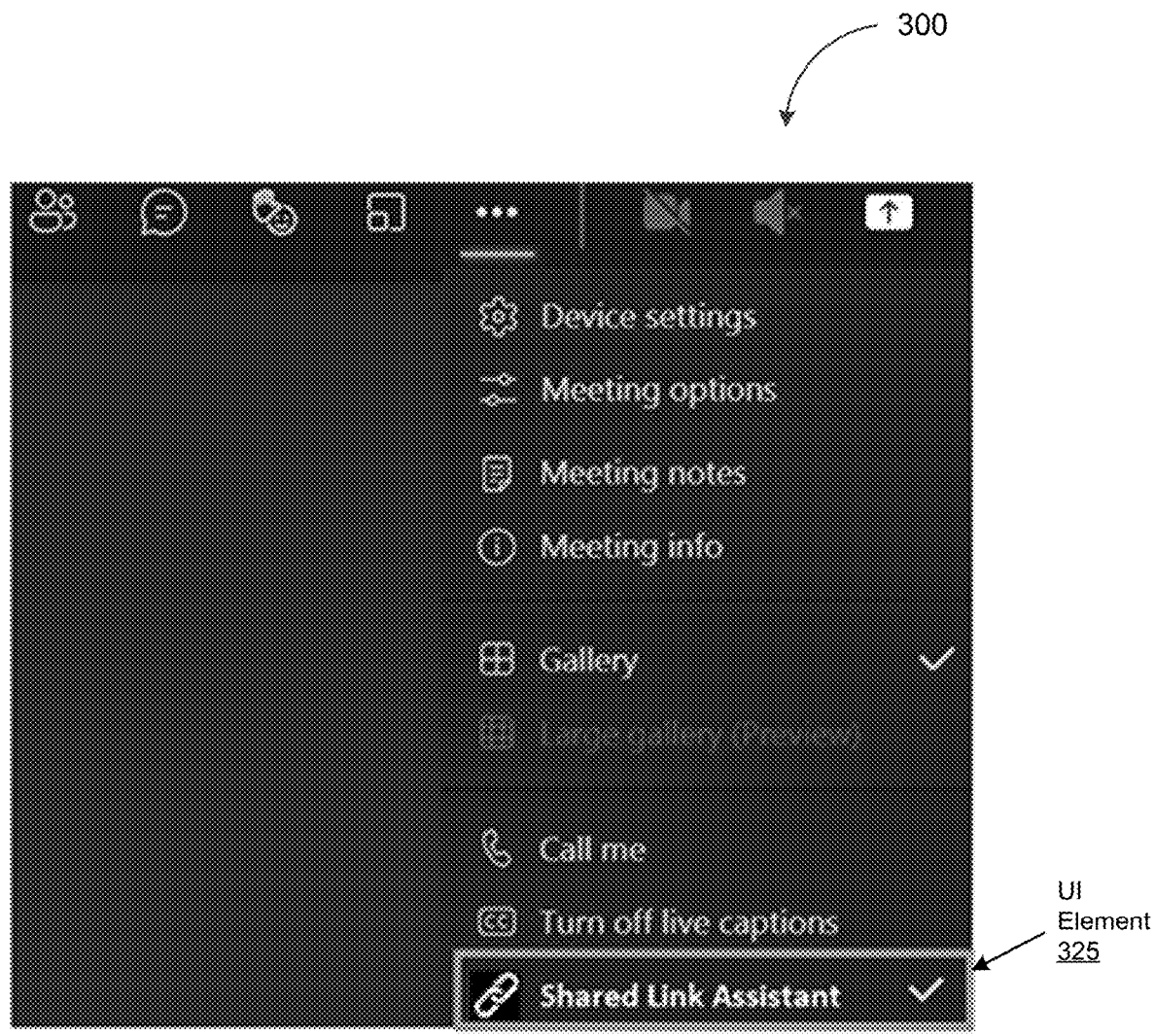
FIG. 3A depicts an example of a user interface, in accordance with some example embodiments.

FIG. 3A depicts an example of a user interface 300 associated with the shared link assistant 115, in accordance with some example embodiments. As shown in FIG. 3A, the user interface 300 may be displayed at the first client device 130a as part of the web conferencing application 135. Moreover, as shown in FIG. 3A, the user interface 300 may include a user interface element 325, which may be selected to activate the shared link assistant 115 and/or to share the link 220. The shared link assistant 115 may determine, based at least on a user input from the first client device 130a selecting the user interface element 325, to share the link 220. For example, the shared link assistant 115 may determine to share the link 220 if the user input from the first client device 130*a* corresponds to one or more gestures indicative of an intent to share the link 220. In response to detecting the one or more gestures indicative of an intent to share the link 220, the shared link assistant 115 may analyze an image of the shared content 200 in order to identify the link 220. For instance, the shared link assistant 115 may perform an image recognition on the image of the shared content 200 to determine, based on one or more features indicative of a resource, whether the shared content 200 includes a resource such as a webpage, a computer program, a multimedia file, and/or an electronic document.

Examples of image recognition techniques include a variety of machine learning based computer vision techniques including, for example, neural networks trained to perform tasks such as image classification, object detection, object tracking, semantic segmentation, and instance segmentation. A resource such as a webpage may be identified based on one or more features indicative of the web browser window 210 such as, for example, the address bar 230. In the event the resource is accessible via a private network (or a virtual private network), the resource may be identified based on one or more features indicative of a network directory.

If the shared content 200 is determined to include a resource, such as a webpage in the example shown in FIG. 2, the shared link assistant 115 may determine a position (e.g., pixel coordinates and/or the like) of the address bar 230. Moreover, the shared link assistant 115 may perform, based at least on the position of the address bar 230, a text recognition in order to extract the link 220, such as the universal resource locator (URL) of the webpage. Examples of text recognition techniques include optical character recognition (OCR) algorithms such as matrix matching, feature extraction, and/or the like. The shared link assistant 115 may perform text recognition in order to identify the alphanumeric characters and/or symbols forming the link 220. To maximize computational efficiency, the shared link assistant 115 may perform text recognition on the pixels that are within the address bar 230 and not the pixels that are outside of the address bar 230. In the event the shared link assistant 115 is unable to extract the link 220, for example, because the text is too small, illegible, and/or obscured, the shared link assistant 115 may generate an error message for display at the first client device 130*a* indicating that the link 220 cannot be extracted for sharing with the second attendee 150*b* at the second client device 130*b*.

Figure 3B:
FIG. 3B depicts an example of another user interface, in accordance with some example embodiments.

In some example embodiments, the shared link assistant 115 may send, to the second client device 130*b*, information for accessing the resource (e.g., the link 220) such that the resource (e.g., the webpage associated with the link 220) to be accessed at the second client device 130*b*. Information for accessing the resource may be sent to the second client device 130*b* over a dedicated virtual desktop channel and/or a real time communication (RTC) channel for web conferencing applications. For example, FIG. 3B depicts an example of another user interface 350 associated with the shared link assistant 115 in which a popup window 355 is generated to display, within the web conference application 135 at the second client device 130*b*, a message including the link 220. Alternatively and/or additionally, information for accessing the resource (e.g., the link 220) may be sent to the second client device 130*b* in a message including, for example, an email, a short messaging service (SMS) message, an instant messaging (IM) message, and/or the like. In some cases, the shared link assistant 110 may require some form of authorization before allowing the second client device 130*b* to access the resource and/or the corresponding link 220. For example, the first attendee 150*a* may be required to give permission to the second client device 130*b* and/or the second attendee 150*b* in order for the shared link assistant 110 to provide the information that enables the second client device 130*b* to open the link 220.

In some example embodiments, by sending the information for accessing the resource, such as the link 220, to the second client device 130*b*, the resource may be accessed at the second client device 130*b* by a web browser opening the corresponding link 220. The web browser at the second client device 130*b* which may be an embedded browser of the web conferencing application 135 and/or the virtual desktop. Where the link 220 references a resource accessed through a private network (or a virtual private network), the link 220 may be opened while the second client device 130*b* is connected to the private network (or the virtual private network) or by an application with micro virtual private network (Micro VPN) functionalities. Moreover, in some cases, the shared link assistant 115 may send, along with the information for accessing the resource (e.g., the link 220), one or more commands that trigger, at the second client device 130*b*, the launch of a corresponding application including, for example, a browser, a media player, a text editor, and/or the like.

Figure 4:
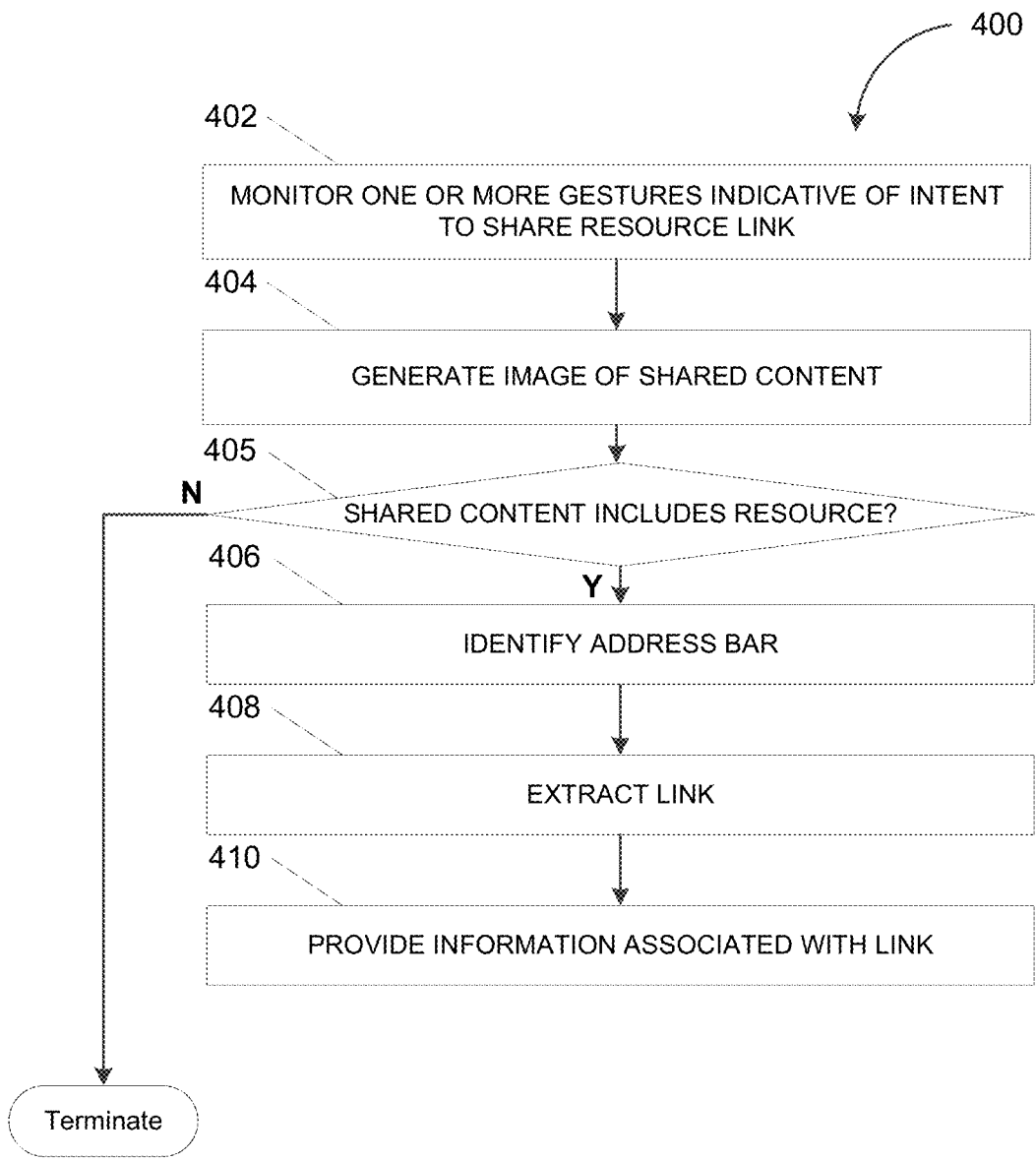
FIG. 4 depicts a flowchart illustrating example of a process for providing access to one or more resources during a remote session, in accordance with some example embodiments.

FIG. 4 depicts a flowchart illustrating an example of a process 400 for providing access to one or more links shared during a remote session, in accordance with some example embodiments. Referring to FIGS. 1-2, 3A-B, and 4, the process 400 may be performed by the web conference server 110, for example, the shared link assistant 115, in order to provide access to the one or more links included in the content shared by the first client device 130*a* with the second client device 130*b*.

At 402, the server 110 may monitor for one or more gestures indicative of an intent to share a link. For example, the first attendee 150*a* at the first client device 130*a* may share, during a remote session with at least the second attendee 150*b* at the second client device 130*b*, content including a resource that is accessible through the link 220. In the example shown in FIG. 2, the link 220 may be the universal resource locator (URL) of the webpage displayed within the web browser window 210 being shared with the second attendee 150*b* at the second client device 130*b*. In some example embodiments, the shared link assistant 115 may monitor for one or more gestures indicative of an intent from the first attendee 150*a* to share the resource associated with the link 220. For instance, the shared link assistant 115 may monitor for a threshold quantity of mouse clicks and/or taps on a touchscreen at the first client device 130*a* such as double mouse clicks or double taps. It should be appreciated that the threshold quantity of mouse clicks and/or taps may be performed at any location within the content being shared during the remote session. Thus, the shared link assistant 115 may detect a gesture indicative of an intent from the first attendee 150*a* to share the resource associated with the link 220 even when the threshold quantity of mouse clicks and/or taps are performed within a threshold distance of the link 220. Alternatively and/or additionally, the shared link assistant 115 may monitor interactions with, for example, the user interface element 325 shown in FIG. 3A, which may be selected to activate the shared link assistant 115 and/or share the resource associated with the link 220.

At 404, the server 110 may generate an image of a shared content. For example, the shared link assistant 115 may generate an image (e.g., a screenshot and/or the like) of the shared content 200, which may include the web browser window 210 in which the link 220, such as the universal resource locator (URL) of the webpage displayed within the web browser window 210, is displayed within the address bar 230. Alternatively, one of the client devices 130 may generate and send the image of the shared content to the server 110 for processing.

At 405, the shared link assistant 115 may determine whether the shared content includes a resource. In some example embodiments, the shared link assistant 115 may perform image recognition in order to determine whether the shared content 200 includes a webpage (or another type of resource). For example, the shared link assistant 115 may apply one or more machine learning based computer vision techniques including, for example, neural networks trained to perform tasks such as image classification, object detection, object tracking, semantic segmentation, and instance segmentation.

At 405-N, the shared link assistant 115 may determine that the shared content does not include a resource. As such, the process 400 may terminate. For example, in the event the shared link assistant 115 determines that the shared content 200 does not include a resource, such as a webpage, the process 400 may terminate as the shared content 200 does not include any links for sharing with the second attendee 150b at the second client device 130b.

Alternatively, at 405-Y, the shared link assistant 115 may determine that the shared content includes a resource. As such, at 406, the shared link assistant 115 may identify an address bar. Moreover, at 408, the shared link assistant 115 may extract the information for accessing the resource. In some example embodiments, if the shared link assistant 115 determines that the shared content 200 includes a resource, such as a webpage, the shared link assistant 115 may perform image recognition in order to determine the position of the address bar 230 containing the link 220. Text recognition, such as optical character recognition (OCR), to extract the link 220 may be performed based on the position of the address bar 230. For instance, the shared link assistant 115 may perform text recognition on the pixels that are within the address bar 230 and not the pixels that are outside of the address bar 230. Doing so may maximize the computational efficiency associated with extracting the link 220.

At 410, the shared link assistant 115 may provide the information for accessing the resource. In some example embodiments, the shared link assistant 115 may send, to the second client device 130b, information for accessing the resource (e.g., the link 220) such that the second client device 130b may access the resource with the link 220. This information may be used by an application at the second client device 130b, such as a browser, a media player, a text editor, and/or the like. For example, a browser at the second client device 130b may open the link 220 to access the corresponding webpage. Upon receiving the information for accessing the resource, such as the link 220, the second client device 130b may access the resource based on the link 220. For example, the link 220 may be opened to access, at the second client device 130b, a resource such as a webpage, a computer program, a multimedia file, an electronic document, and/or the like. For instance, an application, such as a browser, a media player, a text editor, and/or the like, may be launched at the second client device 130b to open the link 220. In some cases, where the link 220 references a resource accessed through a private network (or a virtual private network), the link 220 may be opened while the second client device 130b is connected to the private network (or the virtual private network) or by an application with micro virtual private network (Micro VPN) functionalities.

Figure 5A:
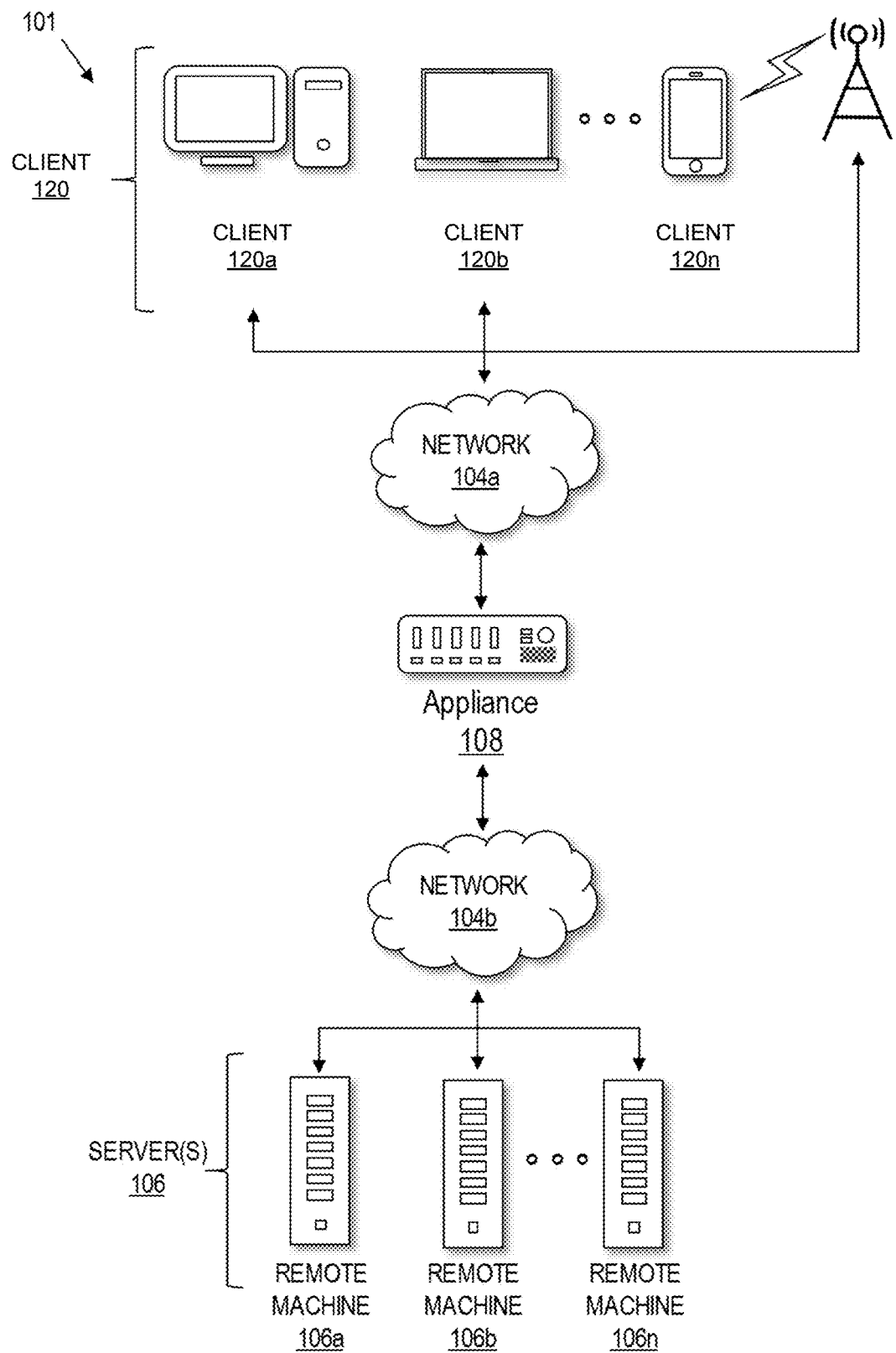
FIG. 5A depicts a network diagram illustrating an example of a network environment, in accordance with some example embodiments.

FIG. 5A depicts a network diagram illustrating an example of a network environment 101, in accordance with some example embodiments. Referring to FIGS. 1-4 and 5A, the network environment 101 in which various aspects of the disclosure may be implemented may include one or more clients 120a-120n, one or more remote machines 106a-106n, one or more networks 104a and 104b, and one or more appliances 108 installed within the network environment 101. The clients 120a-120n communicate with the remote machines 106a-106n via the networks 104a and 104b.

In some example embodiments, the clients 120a-120n may communicate with the remote machines 106a-106n via an appliance 108. The illustrated appliance 108 is positioned between the networks 104a and 104b, and may also be referred to as a network interface or gateway. In some example embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. In some example embodiments, multiple appliances 108 may be used, and the appliance(s) 108 may be deployed as part of the network 104a and/or 104b.

The clients 120a-120n may be generally referred to as client machines, local machines, clients, client nodes, client computers, client devices, computing devices, endpoints, or endpoint nodes. One or more of the clients 120a-120n may implement, for example, the first client device 130a, the second client device 130b, the third client device 130c, and/or the like. The remote machines 106a-106n may be generally referred to as servers or a server farm. In some example embodiments, a client 120 may have the capacity to function as both a client node seeking access to resources provided by a server 106 and as a server 106 providing access to hosted resources for other clients 120a-120n. The networks 104a and 104b may be generally referred to as a network 104. The network 104 including the networks 104a and 104b may be configured in any combination of wired and wireless networks.

The servers 106 may include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality. The servers 106 may include, for example, the shared link assistant 115 and/or the like.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

In some example embodiments, a server 106 may execute a remote presentation services program or other program that uses a thin-client or a remote-display protocol to capture display output generated by an application executing on a server 106 and transmit the application display output to a client 120.

In yet other example embodiments, a server 106 may execute a virtual machine, such as the first virtual machine 125a and/or the second virtual machine 125b, to provide, for example, to the user 150 at the client device 130, access to a computing environment such as the application 135. The virtual machine may be managed by, for example, a hypervisor (e.g., the first hypervisor 165a, the second hypervisor 165b, and/or the like), a virtual machine manager (VMM), or any other hardware virtualization technique within the server 106.

In some example embodiments, the network 104 may be a local-area network (LAN), a metropolitan area network (MAN), a wide area network (WAN), a primary public network, and/or a primary private network. Additional embodiments may include one or more mobile telephone networks that use various protocols to communicate among mobile devices. For short-range communications within a wireless local-area network (WLAN), the protocols may include 802.11, Bluetooth, and Near Field Communication (NFC).

Figure 5B:
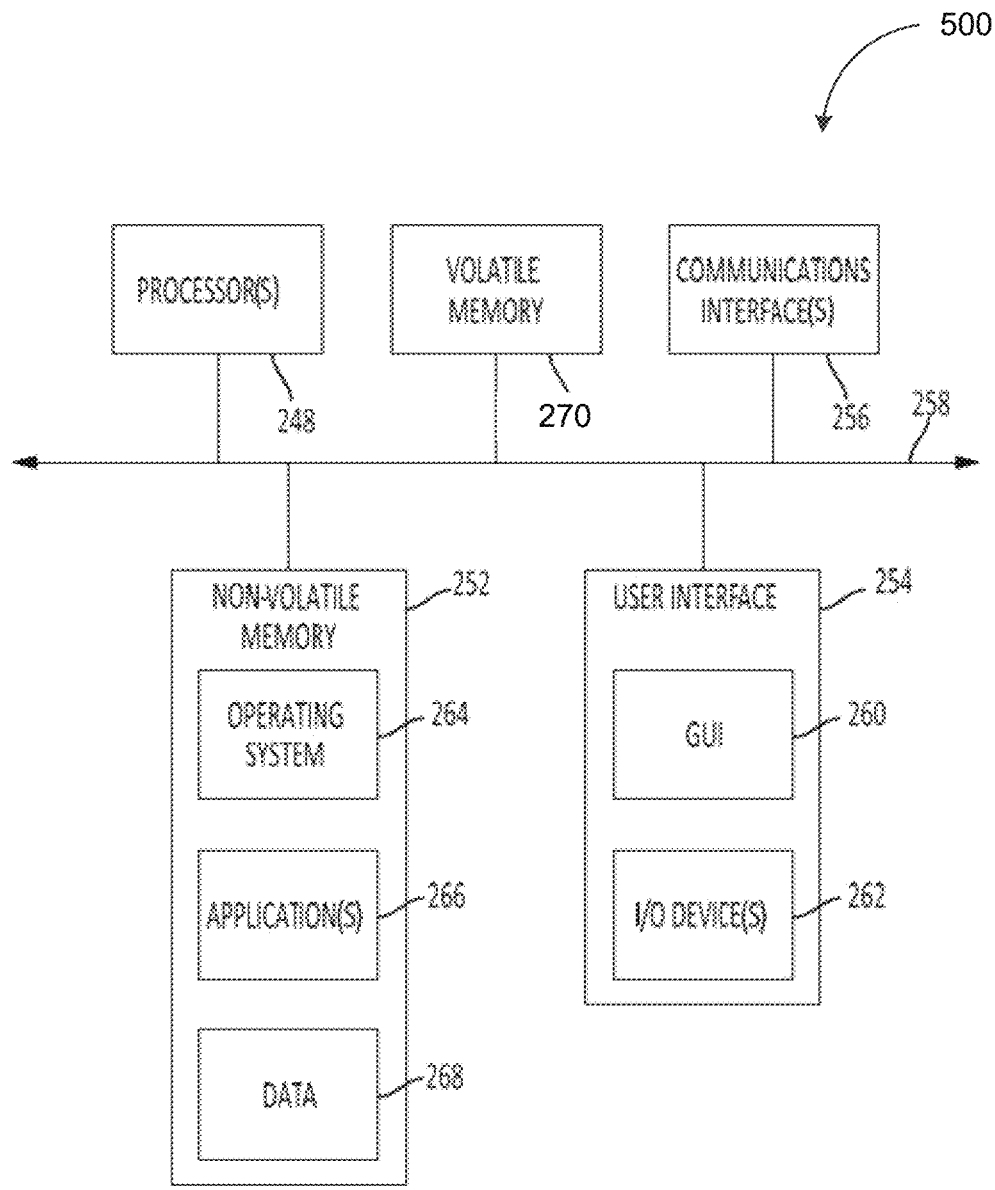
FIG. 5B depicts a block diagram illustrating an example of a computing device, in accordance with some example embodiments.

FIG. 5B depicts a block diagram illustrating an example of a computing device 500, in accordance with some example embodiments. Referring to FIGS. 1-4 and 5A-B, the computing device 500 may be useful for practicing an embodiment of the web conference controller 110 and the client devices 130.

As shown in FIG. 5B, the computing device 500 may include one or more processors 248, volatile memory 270 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, and/or the like) and one or more input/output (I/O) devices 262 (e.g., a mouse, a keyboard, and/or the like). The non-volatile memory 252 may store an operating system 264, one or more applications 266, and data 268 such that computer instructions of the operating system 264 and/or applications 266 are executed by the processor(s) 248 out of the volatile memory 270. Data may be entered using an input device of the GUI 260 or received from I/O device(s) 262. Various elements of the computing device 500 may communicate via communication the communication bus 258. The computing device 500 as shown in FIG. 5B is shown merely as an example, as the web conference controller 110 and the client devices 130 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some example embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some example embodiments, the "processor" may be one or more physical processors or one or more "virtual" (e.g., remotely located or "cloud") processors.

The communications interfaces 256 may include one or more interfaces to enable the computing device 500 to access a computer network such as a local area network (LAN), a wide area network (WAN), a public land mobile network (PLMN), and/or the Internet through a variety of wired and/or wireless or cellular connections.

As noted above, in some example embodiments, one or more computing devices 500 may execute an application on behalf of a user of a client computing device (e.g., the clients 120), may execute a virtual machine, which provides an execution session within which applications execute on behalf of a user or a client computing device (e.g., the clients 120), such as a hosted desktop session (e.g., associated with the application 135), may execute a terminal services session to provide a hosted desktop environment, or may provide access to a computing environment including one or more of: one or more applications, one or more desktop applications, and one or more desktop sessions in which one or more applications may execute.

Figure 5C:
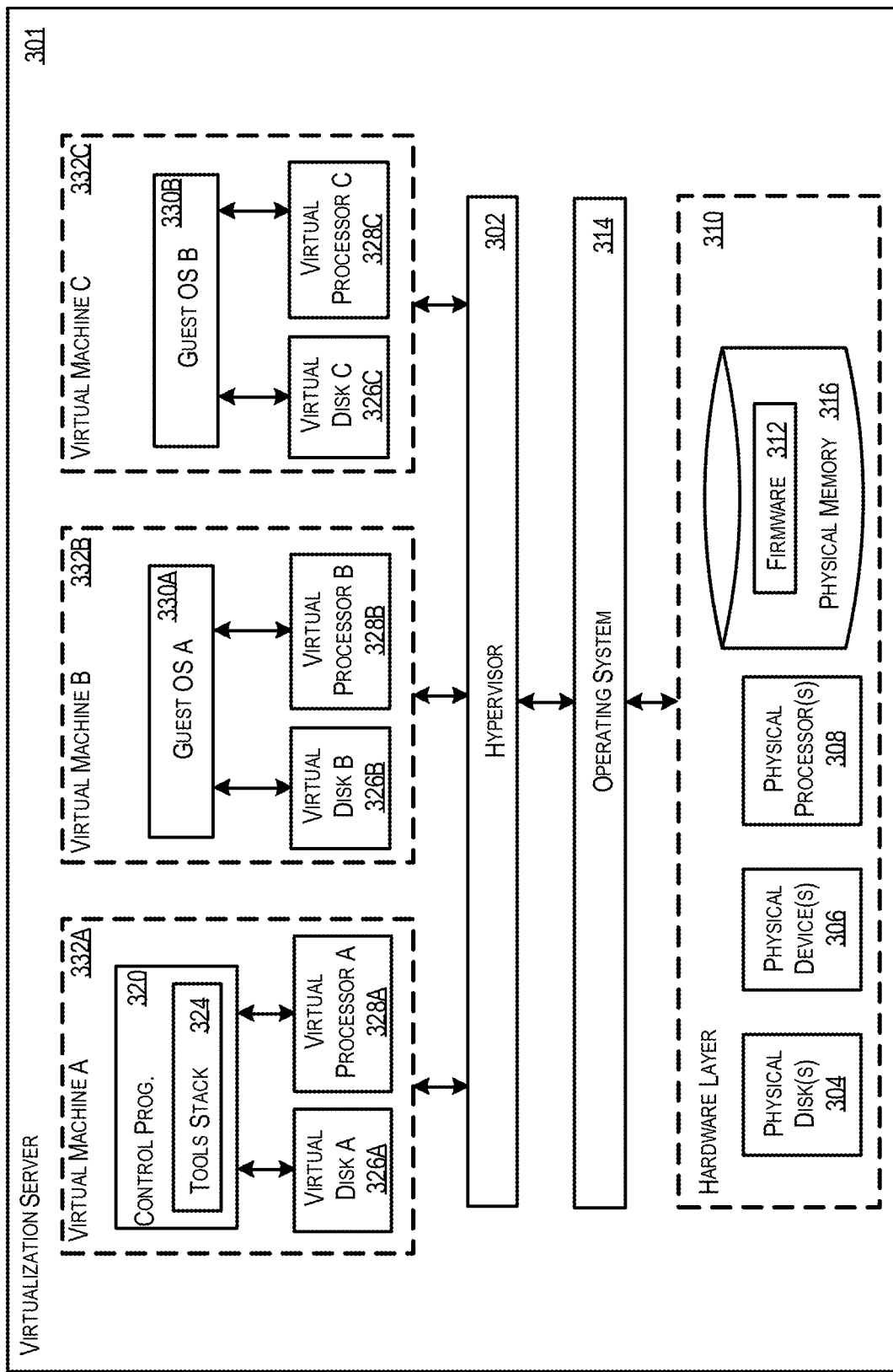
FIG. 5C depicts a high-level architecture of an example of a virtualization system for implementing a computing system, in accordance with some example embodiments.

FIG. 5C depicts a high-level architecture of an example of a virtualization system for implementing the computing system 110, in accordance with some example embodiments. As shown in FIG. 5C, the virtualization system may be a single-server or multi-server system, or a cloud system, including at least one virtualization server 301 configured to provide virtual desktops and/or virtual applications to one or more client access devices 120a-c. A desktop (or a virtual desktop) may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Virtualization server 301 may be configured as a virtualization server in a virtualization environment, for example, a single-server, multi-server, or cloud computing environment. Virtualization server 301 illustrated in FIG. 5C may be deployed as and/or implemented by one or more embodiments of server 106 illustrated in FIG. 5A or by other known computing devices. Included in virtualization server 301 is hardware layer 310 that may include one or more physical disks 304, one or more physical devices 306, one or more physical processors 308, and one or more physical memories 316. In some embodiments, firmware 312 may be stored within a memory element in physical memory 316 and be executed by one or more of physical processors 308. Virtualization server 301 may further include operating system 314 that may be stored in a memory element in physical memory 316 and executed by one or more of physical processors 308. Still further, hypervisor 302 may be stored in a memory element in physical memory 316 and be executed by one or more of physical processors 308. Presence of operating system 314 may be optional such as in a case where the hypervisor 302 is a Type A hypervisor.

Executing on one or more of physical processors 308 may be one or more virtual machines 332A-C (generally 332). Each virtual machine 332 may have virtual disk 326A-C and virtual processor 328A-C. In some embodiments, first virtual machine 332A may execute, using virtual processor 328A, control program 320 that includes tools stack 324. Control program 320 may be referred to as a control virtual machine, Domain 0, Dom0, or other virtual machine used for system administration and/or control. In some embodiments, one or more virtual machines 332B-C may execute, using virtual processor 328B-C, guest operating system 330A-B (generally 330).

Physical devices 306 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., a router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 310 may include any type of memory. Physical memory 316 may store data, and in some embodiments may store one or more programs, or set of executable instructions. FIG. 5C illustrates an embodiment where firmware 312 is stored within physical memory 316 of virtualization server 301. Programs or executable instructions stored in physical memory 316 may be executed by the one or more processors 308 of virtualization server 301.

Virtualization server 301 may also include hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 may be any combination of executable instructions and hardware that monitors virtual machines 332 executing on a computing machine. Hypervisor 302 may be a Type 2 hypervisor, where the hypervisor executes within operating system 314 executing on virtualization server 301. Virtual machines may then execute at a layer above hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within hardware layer 310. That is, while Type 2 hypervisor 302 accesses system resources through host operating system 314, as shown, a Type 1 hypervisor may directly access all system resources without host operating system 314. A Type 1 hypervisor may execute directly on one or more physical processors 308 of virtualization server 301, and may include program data stored in physical memory 316.

Hypervisor 302, in some embodiments, may provide virtual resources to guest operating systems 330 or control programs 320 executing on virtual machines 332 in any manner that simulates operating systems 330 or control programs 320 having direct access to system resources. System resources can include, but are not limited to, physical devices 306, physical disks 304, physical processors 308, physical memory 316, and any other component included in hardware layer 310 of virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for virtual machine 332 executing on virtualization server 301. Examples of hypervisor 302 may include those manufactured by VMWare, Inc., of Palo Alto, California; Xen Project® hypervisor, an open source product whose development is overseen by the open source XenProject.org community; Hyper-V®, Virtual Server®, and Virtual PC® hypervisors provided by Microsoft Corporation of Redmond, Washington; or others. The virtualization server 301 may execute hypervisor 302 that creates a virtual machine platform on which guest operating systems 330 may execute. When this is the case, virtualization server 301 may be referred to as a host server. An example of such a virtualization server is Citrix Hypervisor® provided by Citrix Systems, Inc., of Fort Lauderdale, Florida.

Hypervisor 302 may create one or more virtual machines 332B-C (generally 332) in which guest operating systems 330 execute. In some embodiments, hypervisor 302 may load a virtual machine image to create virtual machine 332. The virtual machine image may refer to a collection of data, states, instructions, etc., that make up an instance of a virtual machine. In other embodiments, hypervisor 302 may execute guest operating system 330 within virtual machine 332. In still other embodiments, virtual machine 332 may execute guest operating system 330.

In addition to creating virtual machines 332, hypervisor 302 may control the execution of at least one virtual machine 332. The hypervisor 302 may present at least one virtual machine 332 with an abstraction of at least one hardware resource provided by virtualization server 301 (e.g., any hardware resource available within hardware layer 310). In some implementations, hypervisor 302 may control the manner in which virtual machines 332 access physical processors 308 available in virtualization server 301. Controlling access to physical processors 308 may include determining whether virtual machine 332 should have access to processor 308, and how physical processor capabilities are presented to virtual machine 332.

As shown in FIG. 5C, the virtualization server 301 may host or execute one or more virtual machines 332. Virtual machine 332 may be a set of executable instructions and/or user data that, when executed by processor 308, may imitate the operation of a physical computer such that virtual machine 332 can execute programs and processes much like a physical computing device. While FIG. 5C illustrates an embodiment where virtualization server 301 hosts three virtual machines 332, in other embodiments virtualization server 301 may host any number of virtual machines 332. Hypervisor 302 may provide each virtual machine 332 with a unique virtual view of the physical hardware, including memory 316, processor 308, and other system resources 304, 306 available to that virtual machine 332. The unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to virtual machines 332.

Each virtual machine 332 may include virtual disk 326A-C (generally 326) and virtual processor 328A-C (generally 328.) Virtual disk 326 may be a virtualized view of one or more physical disks 304 of virtualization server 301, or a portion of one or more physical disks 304 of virtualization server 301. The virtualized view of physical disks 304 may be generated, provided, and managed by hypervisor 302. In some embodiments, hypervisor 302 may provide each virtual machine 332 with a unique view of physical disks 304. These particular virtual disk 326 (included in each virtual machine 332) may be unique, when compared with other virtual disks 326.

Virtual processor 328 may be a virtualized view of one or more physical processors 308 of virtualization server 301. The virtualized view of physical processors 308 may be generated, provided, and managed by hypervisor 302. Virtual processor 328 may have substantially all of the same characteristics of at least one physical processor 308. Virtual processor 308 may provide a modified view of physical processors 308 such that at least some of the characteristics of virtual processor 328 are different from the characteristics of the corresponding physical processor 308.

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
at least one data processor; and
at least one memory storing instructions, which when executed by the least one data processor, cause the at least one data processor to execute operations comprising:
    establishing a remote session, during which a first client device shares a content with a plurality of participant devices;
    detecting, within the remote session, a gesture indicative of an intent of a participant using the first client device in the remote session to share a resource included within the content being shared by the first client device participating in the remote session, the resource being available on a network, the gesture comprising a selection of an element to activate a shared link assistant from a drop down menu;
    extracting, from an image of the content shared in real time, information for accessing the resource, by using the shared link assistant activated by a detection of the selection of the element, wherein the extracting comprises:
        performing, on the image of the content, a first image recognition to determine that the content comprises the information for accessing the resource, the information comprising one or more features indicative of a network directory;
        in response to determining that the content comprises the information for accessing the resource, performing, on the image of the content, a second image recognition to determine a position of an address bar; and
        performing, based at least on the position of the address bar, a text recognition to identify one or more alphanumeric characters or symbols representative of the information for accessing the resource; and providing, to a second client device participating in the remote session, at least a portion of the information to enable the second client device to access the resource.

2. The system of claim 1, wherein the first image recognition or the second image recognition are performed by applying one or more neural networks trained to perform image classification, object detection, object tracking, semantic segmentation, or instance segmentation.

3. The system of claim 1, wherein the text recognition is performed by applying one or more optical character recognition (OCR) techniques.

4. The system of claim 1, wherein the text recognition is performed on a plurality of pixels within the address bar.

5. The system of claim 1, wherein the at least one data processor is further caused to at least:

in response to a failure to extract the information from the image of the content, generate, for display at the first client device, a message that indicates error.

6. The system of claim 1, wherein the information sent to the second client device triggers a launch of an application to access the resource, and wherein the application comprises a browser, a media player, and/or a text editor.

7. The system of claim 1, wherein the resource comprises a webpage, a computer program, a multimedia file, and/or an electronic document.

8. The system of claim 1, wherein the information for accessing the resource comprises a universal resource locator (URL), a hyperlink, a web address, or a network path.

9. The system of claim 1, wherein the gesture comprises a threshold quantity of mouse clicks or taps on a touchscreen.

10. The system of claim 1, wherein the remote session comprises a web conference session comprising the first client device and the second client device.

11. The system of claim 1, wherein the content shared by the first client device is displayed at the first client device and the second client device.

12. A computer-implemented method, comprising:

establishing a remote session, during which a first client device shares a content with a plurality of participant devices;

detecting, within the remote session, a gesture indicative of an intent of a participant using the first client device in the remote session to share a resource included within the content being shared by the first client device participating in the remote session, the resource being available on a network, the gesture comprising a selection of an element to activate a shared link assistant from a drop down menu;

extracting, from an image of the content shared in real time, information for accessing the resource, by using the shared link assistant activated by a detection of the selection of the element, wherein the extracting comprises:

performing, on the image of the content, a first image recognition to determine that the content comprises the information for accessing the resource, the information comprising one or more features indicative of a network directory;

in response to determining that the content comprises the information for accessing the resource, performing, on the image of the content, a second image recognition to determine a position of an address bar; and performing, based at least on the position of the address bar, a text recognition to identify one or more alphanumeric characters or symbols representative of the information for accessing the resource; and providing, to a second client device participating in the remote session, at least a portion of the information to enable the second client device to access the resource.

13. The method of claim 12, wherein the first image recognition or the second image recognition are performed by applying one or more neural networks trained to perform image classification, object detection, object tracking, semantic segmentation, or instance segmentation.

14. The method of claim 12, further comprising:

in response to a failure to extract the information from the image of the content, generating, for display at the first client device, a message that indicates error.

15. The method of claim 12, wherein the information sent to the second client device triggers a launch of an application to access the resource, and wherein the application comprises a browser, a media player, and/or a text editor.

16. The method of claim 12, wherein the resource comprises a webpage, a computer program, a multimedia file, and/or an electronic document, and wherein the information for accessing the resource comprises a universal resource locator (URL), a hyperlink, a web address, or a network path.

17. The method of claim 12, wherein the gesture comprises a threshold quantity of mouse clicks or taps on a touchscreen.

18. A non-transitory computer readable medium storing instructions, which when executed by at least one data processor, result in operations comprising:

establishing a remote session, during which a first client device shares a content with a plurality of participant devices;

detecting, within the remote session, a gesture indicative of an intent of a participant using the first client device in the remote session to share a resource included within the content being shared by the first client device participating in the remote session, the resource being available on a network, the gesture comprising a selection of an element to activate a shared link assistant from a drop down menu;

extracting, from an image of the content shared in real time, information for accessing the resource, by using the shared link assistant activated by a detection of the selection of the element, wherein the extracting comprises:

performing, on the image of the content, a first image recognition to determine that the content comprises the information for accessing the resource, the information comprising one or more features indicative of a network directory;

in response to determining that the content comprises the information for accessing the resource, performing, on the image of the content, a second image recognition to determine a position of an address bar; and performing, based at least on the position of the address bar, a text recognition to identify one or more alphanumeric characters or symbols representative of the information for accessing the resource; and providing, to a second client device participating in the remote session, at least a portion of the information to enable the second client device to access the resource.

\* \* \* \* \*